Figure 1:
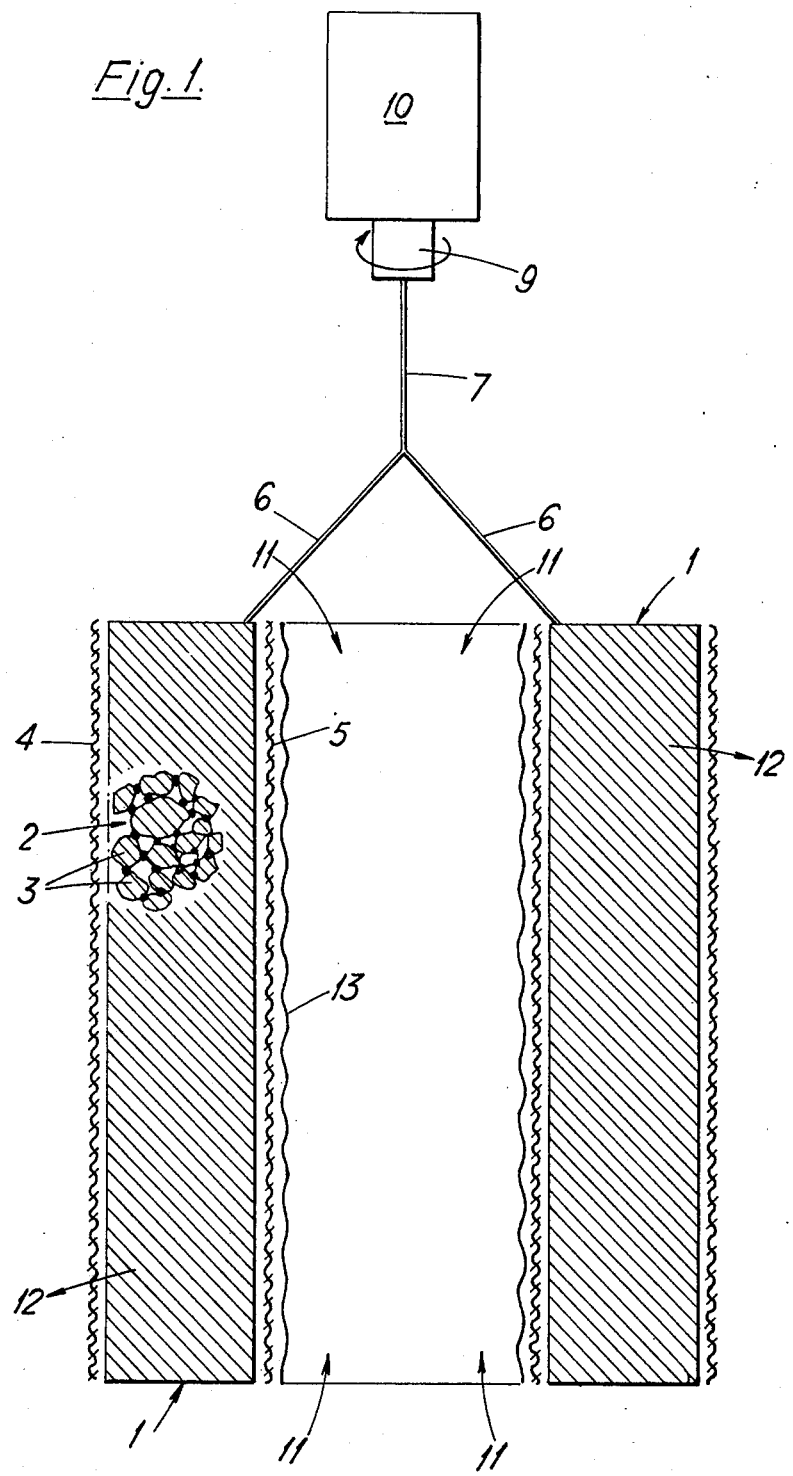

United States Patent [19]

Redfarn et al.

[11] 4,000,236
[45] Dec. 28, 1976

[54] MAKING A CONGLOMERATED BONDED MASS CONSISTING OF PARTICLES OF ACTIVATED CARBON

[75] Inventors: Cyril A. Redfarn; John Bedford, both of London, England

[73] Assignee: Patent Protection Limited, Great Britain

[22] Filed: Aug. 11, 1970

[21] Appl. No.: 62,872

[30] Foreign Application Priority Data

Aug. 22, 1969 United Kingdom ............ 42010/69
Oct. 17, 1969 United Kingdom ............ 51205/69
May 15, 1970 United Kingdom ............ 23731/70

[52] U.S. Cl. .............................. 264/112; 264/122; 264/123
[51] Int. Cl.² ......................................... B01J 2/28
[58] Field of Search ........... 264/109, 123, 122, 112

[56] References Cited
UNITED STATES PATENTS

| 2,624,079 | 1/1953 | Duvall | 264/113 |
| 3,318,317 | 5/1967 | Sproull et al. | 131/265 |
| 3,538,020 | 11/1970 | Heskett et al. | 264/122 |

Primary Examiner—Robert F. White
Assistant Examiner—James R. Hall
Attorney, Agent, or Firm—Stevens, Davis, Miller & Mosher

[57] ABSTRACT

A method of forming a conglomerated, bonded and preferably molded mass of particles of activated carbon bonded together by means of a polymer which is rendered adhesive by a solvent permeating a random and loose mass of the carbon particles and subsequently drained off.

11 Claims, 3 Drawing Figures

MAKING A CONGLOMERATED BONDED MASS CONSISTING OF PARTICLES OF ACTIVATED CARBON

This invention relates to the formation of a conglomerated bonded mass of activated carbon particles, in a manner which enables moldings to be made of any shape suitable for the purpose of acting as an adsorbent element for fluid. Loose particles, confined in a suitable container for air purification, for purifying various liquids such as sugar in fluid form or in solution, or for trapping vapor which can subsequently be recovered, are commonly known. It has been proposed to make a conglomerated bonded mass of activated carbon particles together with a solid desiccant by dispersing a binder throughout a mixed mass of the activated carbon particles and desiccant by means of a liquid dispersing medium or vehicle which was to form a plastic mixture with the binder, the dispersing medium being evaporated off so as to leave the binder acting as such in the mass. Such a method is not well adapted to the making of a simple conglomerated mass of activated carbon particles, if only because it tends to leave a deposit of the binder on a substantial part of the surface areas of the activated carbon particles which obviously reduces their adsorbing properties. Moreover, the previous proposed method required a narrow and particular selection of the binder and its solvent, such that the uses to which the product could be put were themselves limited. The known method may perhaps be tolerable when the mass is to be both adsorbent of impurities and to act as a desiccant but it is uneconomic when the purpose is to provide only for adsorbtion. It has been proposed to make a filter or trap particularly as a tip for a cigarette, in which activated carbon particles were to be bonded together by mixing dry activated carbon particles with solvent-softened polymer particles. Clearly the act of mixing will inevitably result in some of the superficial area of the carbon being smeared over with polymer, so that the effective exposed area of carbon will be reduced; it will be realised that the control of such a method, to limit the amount of smearing if it were to be effective, would be difficult and uncertain.

It has also been proposed to use as a binder for a dual function (that is adsorbtion and desiccation) a conglomerated bonded mass of activated carbon particles in molded block form as indicated above, a polymer in particulate form mixed with the carbon and to plasticise the polymer by heating the mass; this provides no discrimination between the undesirable coating of an indeterminate but substantial proportion of the superficies of the activated carbon particles, and the desirable very localised bonding of the particles.

Activated carbon particles in the form of chips of microporous carbon are commonly used as the adsorbent deodourising material in air purifying equipment, and it is to such material (in which there is commonly a certain amount of finer particles) that the invention is preferably applied.

Air purifying equipment of such material comprises means for continuously sucking the air in a confined space such as a room through a pack of the activated carbon particles so that unpleasant odors arising for example from cooking, stale tobacco smoke, industrial manufacturing processes, and a concourse of animals or human beings, are removed. Often the pack is of loose particles compacted in some form of container, but it is also well known to conglomerate the activated carbon particles in the form of molded blocks by bonding, as above mentioned.

A disadvantage of these previously proposed bonding processes is that they require very careful control in order to get sufficient liquefaction (by fusion or solution) of the polymer to form the bonds without at the same time getting so much liquefaction that the polymer unduly coats the activated carbon particles and impairs their adsorptive power, and at the same time spreading out so much that a larger amount of polymer particle is required in order to get a satisfactorily bonded block. By no method of the prior art can the above unique control be achieved.

The main aim of the present invention is to provide a molded block of predetermined shape of activated carbon particles for use in purifying a fluid to which the block is porous, which block is sufficiently strongly bonded and conglomerated to resist vibration and shock which would result in disintegration, while still being both porous as to its individual particles and virtually unaffected as to the effective exposed superficial area of the particles. Indeed the use of the invention has been found in practice to have the surprising effect of enhancing the effectiveness of the activated carbon particles.

The present invention relates to a method of making a conglomerated bonded mass of activated carbon particles residing in bonding the activated carbon particles (that is to say at least sufficient of them to ensure holding together of the mass) by permeating a random and loose mass of the activated carbon particles with an active solvent; draining off any surplus active solvent; thoroughly mixing the activated carbon particles with a relatively small quantity of a particulate dry solid soluble polymer, which is soluble in the active solvent allowing time for at least some of the permeated solvent in the activated carbon particles to come out and render the dry solid soluble polymer particles now adhesive polymer particles, but without dispersing the adhesive, and then removing remaining solvent by evaporation. The solvent thus renders the solid soluble polymer particles locally adhesive to the activated carbon particles so that the whole mass is now bonded by the solid soluble polymer particles, and sets as a rigidly conglomerated bonded mass with the superficies of the activated carbon particles covered by the solid soluble polymer particles only over the relatively small areas of adhesion.

In a variation of the method, the particulate dry solid soluble polymer is, at the time of mixing, a solid uncured polymer which is heat-curable, and the mixed mass is heated so as to fuse and cure the polymer; the conglomerated bonded mass of activated carbon particles thus obtained is solvent-resistant. In such variant the active solvent may be water and the particulate dry solid soluble polymer is for example water soluble polyacrylamide with which is mixed paraformaldehyde to give a mixture which cures on heating.

The permeation of the activated carbon particles may be effected by immersing the particles in active solvent until saturated, or by exposing the particles to a saturated atmosphere of a vapor of the active solvent.

Among the suitable particulate dry solid soluble polymers for forming the adhesions are the water soluble polymers of which a favoured example is hydroxy propyl methyl cellulose as described below; methyl cellulose; sodium carboxy methyl cellulose; polyacrylamide; gelatin; cellulose acetate of low acetate content; and polyethylene oxide. When the conglomerated bonded mass of activated carbon particles in molded block form of the invention is required for use in damp conditions a water insoluble particulate dry solid soluble polymer such as polyvinyl formal and polystyrene is used. It is preferable that the said polymer should be of high molecular weight so that it is not too readily soluble in the active solvent for the said polymer. Thus on coming in contact with the active solvent the dry solid soluble polymer particles may swell and become adhesive without forming a free-flowing solution. If, however, the dry solid soluble polymer particles are too readily active soluble in the solvent, their solubility may be restricted by mixing a little non-solvent liquid with the already active solvent-wetted activated carbon particles before the dry solid soluble polymer particles are mixed in. The dry solid soluble polymer particles should not be of too fine a mesh because fineness of particle size makes solubility easier and hence increases the tendency of the said polymer particles to spread over the superficies of the activated carbon particles beyond the area required for adequate adhesion, thus impairing the readiness of the activated carbon particles to adsorb the impurities.

No more of the particulate dry solid soluble polymer than is enough to give a conglomerated bonded mass of activated carbon particles in molded block form of adequate handling and non-disintegrating strength is used; in practice 5–10% of dry solid soluble polymer particles based on the weight of dry activated carbon particles is found to suffice, with the activated carbon particle grade described below. However, it is evident that the proportion by weight of dry solid soluble polymer particles to activated carbon particles will vary in an inverse relationship with carbon grade size if minimal area of adhesion is to be achieved.

The conglomerated bonded mass of activated carbon particles in the form of molded blocks preferably have skins of very porous fabric over their external surfaces; this is caused to adhere lightly to the said block by being used to line the mold used for making the said block, and it adheres preferentially to the block when parted from the mold. Loosely woven hessian or cotton is suitable, and serves not only to prevent any of the activated carbon particles on the surface of the said block from being rubbed off, but to act as a coarse filter to prevent larger objects such as flies etc. from entering the interstices of the said block.

The following are examples of performance of this invention:

EXAMPLE 1

650 gm. of activated carbon particles as later specified were put in a vessel, covered with water, allowed to stand for about ten minutes, and excess water poured off. This process removed loose carbon dust and was repeated twice more. Then 32.5 gms. of particulate dry solid soluble polymer in the form of hydroxy propyl methyl cellulose (commercially available as Methofas PM4500; Imperial Chemical Industries Limited) were blended into the damp activated carbon particles by intimate mechanical mixing by gentle tumbling in a closed vessel, so as to make a random uniform dispersion, and the mix was put into a perforated metal open block mold 30 shown in FIG. 3. The dimensions are 203.2mm. × 203.2mm. × 25.4mm. with the narrow (2.5cm) edges lined with cardboard strips 32 and the base lined with the loosely woven thin muslin 34 known as "butter muslin". The mix was pressed down and covered with further butter muslin to give a block. The block was then dried by blowing warm air through it so as to remove the remaining water by evaporation. Upon removal from the mold, the conglomerated bonded mass of activated carbon particles in molded block form was found to be extremely porous, rigidly aggregated, and eminently suitable as an air purifying element.

EXAMPLE 2

50 gm. of activated carbon particles as later specified were mixed with 12 gm. of active solvent, acetone, then sufficient non-solvent liquid water was added to wet the surface of the carbon. 5 gm. (of particulate dry solid soluble polymer in the form of) polyvinyl acetate (commercially available as P.V.A. grade S88; Shawinigan Ltd.) were then stirred in and thoroughly dispersed by mechanical mixing and the mix was put into a circular perforated metal mold 75 mm. in diameter and 25 mm. deep. The mold was then warmed at 75°–80° C to remove the water and acetone from the mix by evaporation, the temperature finally being raised to 120° C to insure substantial complete removal of the acetone and water to give a rigid conglomerated bonded mass of activated carbon particles in molded block form.

EXAMPLE 3

50 gm. of activated carbon particles as later specified were soaked with water and surplus water drained off; then 2.5 gm. particulate dry solid soluble polymer in the form of polyacrylamide (commercially available as Cyanamer P250; Cyanamid of Great Britain Ltd.) were stirred into water treated activated carbon particles thoroughly until uniformly dispersed. The slurry-like mix was put into a circular perforated metal mold 75 mm. in diameter and 25mm. thick. The mold was then warmed to 95°–100° C to remove the water by evaporation to give a conglomerated bonded mass of activated carbon particles in molded block form.

EXAMPLE 4

50 gm. of activated carbon particles as later specified were soaked with water and surplus water drained off; then a mixture of 2.5 gm. of the polyacrylamide as in Example 3 and 0.25 gm. paraformaldehyde was stirred thoroughly with the activated carbon particles until uniformly dispersed, and the mix put into a circular perforated metal mold 75 mm. in diameter and 25 mm. thick. The mold was warmed to 95°–100° C to remove the water and finally at 120°–130° C to cure the polyacrylamide with the paraformaldehyde to give a solvent resistant conglomerated bonded mass of activated carbon particles in molded block form.

In Examples 2, 3, and 4, the mold was lined with muslin as in Example 1.

While single cubiform or disc-like blocks as molded according to the above examples are useful in themselves, either singly or in packs, the invention also enables a highly practicable and effective room-air purifier to be made, and an example of this is illustrated by FIG. 1 of the accompanying drawings.

Figure 2:
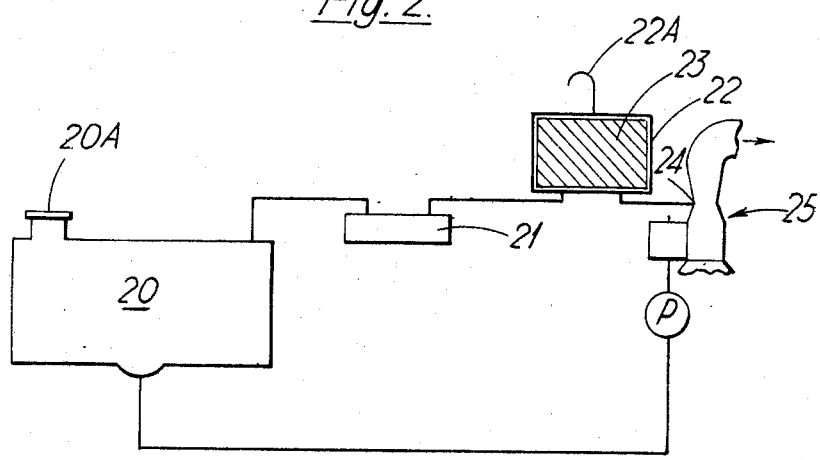

FIG. 2 diagrammatically illustrates the invention as applied to a gasoline-vapor trap of an automobile.

Figure 3:
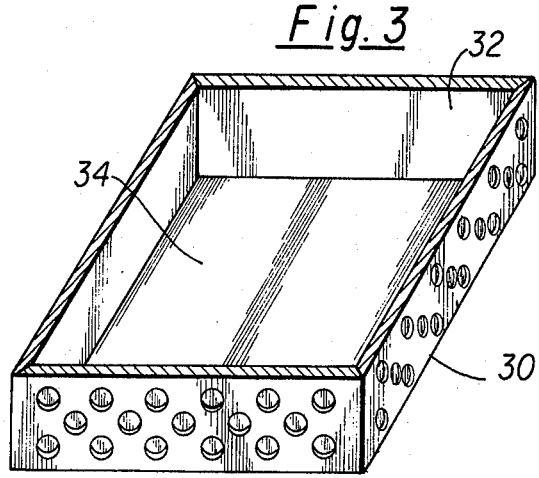

FIG. 3 illustrates a perforated metal open block-mold used to mold the conglomerated mass.

FIG. 1 is a sectioned representation of a conglomerated mass of activated carbon particles in the form of a molded cylindrical tube generally shown in section at 1, made according to the invention and suitable for use as an air purifying block. At 2 is indicated, by way of an illustrative scaled-up "insert" in the thickness of the conglomerated mass of activated carbon particles 1, the basic structure thereof, which comprises activated carbon particles such as 3 with randomly uniformly dispersed particles, shown as black dots, of the particulate dry solid soluble polymer that acts as the bond. The polymer particles have adhesions at the small areas where the activated carbon particles 3 are in contact or near-contact so that at least the larger carbon particles are bonded, the whole mass of activated carbon particles thereby being conglomerated.

In forming the conglomerated bonded mass of activated carbon particles 1, the cylindrical walls of the mold (i.e. the core and the inner surface of the mold) which are not shown are covered with layers of fabric which are shown as 4 and 5 of the conglomerated bonded activated carbon mass in the form of a cylindrical tube, FIG. 1. These layers adhere to the particles of solid soluble polymer on the surface of the above conglomerated mass and serve the purposes above mentioned; for clarity in the drawing they are shown spaced from the activated carbon particles but in practice they are of course in direct contact.

In operation as an adsorber the conglomerated bonded mass of activated carbon particles in the form of a molded cylindrical tube 1 is suspended by (say) three wires 6 which join into a single suspending wire 7 which is in turn attached to the driven shaft 9 of an electric motor indicated at 10, the motor being attachable to the ceiling of a room. The motor both suspends and rotates the conglomerated bonded mass of activated carbon particles. Impure air enters into the two open ends as indicated by the arrows 11, and being entrained in the pores of the conglomerated mass of activated carbon particles is centrifuged through it, is purified by adsorbtion, and the purified air is discharged as indicated by the arrows 12. A coarse paper filter sleeve, indicated at 13, may be fitted in the bore of the said cylindrical tube to serve as a removable and disposable filter to arrest solids. The whole of such a device may obviously be mounted on a base (not shown) with a vertical upstanding spindle coaxially centred in the tube cylindrical tube, to afford a table-top air purifier. The rigidity and adequate mechanical strength of the conglomerated bonded mass 1 that comprises the said cylindrical tube, make such a device practicable; the element may be regarded as disposable, but if any such elements are used on a large scale it may be economic to regenerate them after a period of use, by heating or by washing, depending on the nature of the exposure to which they have been subjected. Or, the element may be broken up, have, when appropriate, its bonding dissolved out, regenerated, and its reactivated carbon particles are then available for re-use.

A purifier on the line of FIG. 1 may obviously be used in a liquid if required.

In FIG. 2 is diagrammatically illustrated the application of the invention to an automobile fuel vapor trap. In this the main fuel tank 20 has a sealed filler cap 20A and is associated with an overflow tank 21 to receive liquid fuel which may escape into it by reason of expansion in the tank 20. From above the liquid (if any) in tank 21 a lead runs to the bottom of a vapor trap which is a chamber 22 having an outlet 22A open to atmosphere; the chamber 22 is completely filled by a conglomerated bonded mass of activated carbon particles in molded block form as described elsewhere herein. A lead 24 runs from the bottom of the chamber 22 to a suction point at 24A in the carburetor generally indicated at 25, which is supplied by fuel pump P from the main tank 20. A flame-trap, such as a copper gauze packing, may be interposed between 22 and 24 to prevent an engine backfire from igniting a fuel-air mixture in the trap chamber 22.

Suppose the tank 20 to have been filled with cool gasoline on a hot day. Its contents expand and this is accommodated in tank 21. Gasoline evaporating in tank 21, or even in tank 20, flows into trap chamber 22 and there it is adsorbed by the conglomerated bonded mass of activated carbon particles in molded block form 23. Air which may likewise escape, passes out via 22A. Assuming now that the engine is started, air is sucked into the carburetor 25 both through the usual air intake and through the chamber 22; the air sucked in through 22A and through the conglomerated bonded mass of activated carbon particles in molded block form 23 purges the carbon particles by evaporating off the gasoline trapped thereby. Thus gasoline, which would otherwise have polluted the atmosphere, is recovered and consumed in the engine, thus of course regenerating that is reactivating the carbon particles for the next occasion of vapor escape. Such further small intake of air via 22A, 22 and 24 into the engine is not significant in terms of engine performance and is, in any case, subject to the filtering action of the conglomerated bonded mass of activated carbon particles in molded block form. The chamber 22 may have an easily removable top to enable the molded block 23 to be removed if required.

SUMMARY

Industry offers standard grades of activated carbon particles and these are usually specified in terms of the size of a mesh. Thus for example, a size which we have used successfully is graded ¼/6. This is a grading according to British Standard 481 and it indicates a particle size such that at least 90% of particles pass through a test sieve having apertures 0.25 in/sq. and are retained on a test sieve having apertures of about 0.11 in/sq. It is to be observed that satisfactory conglomerated bonded masses of activated carbon particles in molded block form have been made in which the percentage of weight of particulate dry solid soluble polymer based on the weight of activated carbon particles was 5 to 10%.

Of the particulate dry solid soluble polymers used as binders the water-soluble cellulose derivatives and polyacrylamide give the most satisfactory conglomerated bonded masses of activated carbon particles in molded block form, but these would tend to be softened in humid conditions. Of the moisture-resistant particulate dry solid soluble polymers used, polyvinyl acetate, polyvinyl acetal, polyvinyl formal and polyacrylamide cured with formaldehyde give the most satisfactory conglomerated bonded masses of activated carbon particles in molded block form for use under humid conditions.

As to active solvents: obviously when there is a selection of the particulate dry solid soluble polymer to be used as a bond, there is corresponding selection of active solvent.

If, as is common, water as active solvent is practicable, we propose:

Water with hydroxypropyl methyl cellulose and related cellulose derivatives, polyvinyl alcohol, polyacrylamide, urea-formaldehyde resins, casein.

Where water solubility is impracticable, we propose active solvents.

Ethanol with polyvinyl butyral and phenolformaldehyde resins.

Acetone with polyvinyl acetate, cellulose acetate.

Ethyl Methyl ketone with vinyl chloride acetate copolymers.

Ethanol/toluene mixture with polyvinyl formal.

Carbon tetrachloride with polystyrene.

The degree of solubility of the particulate dry solid soluble polymer in the active solvent does not appear to be highly significant because a polymer solution is not used as the binder. It is sufficient for the dry solid soluble polymer particles to be softened superficially by its active solvent and thus to become adhesive in the areas of contact with the activated carbon particles.

In the experiments reported above only one grade of activated carbon particles has been used, namely that which is indicated above.

Hydroxy propyl methyl cellulose (Methofas PM 4500) of 20 to 50 British Standard mesh is a suitable water-soluble particulate dry solid soluble polymer for the exercise of this present invention. The number 4500 is the viscosity in poises at 20° C of the 2% aqueous solution of the polymer. It was found that the greater part of the Methofas particles passes through a 20 mesh sieve (that is a sieve having an aperture size of 0.0275 in/sq.) and is retained on a 50 mesh (that is a sieve having an aperture size of 0.0116 in/sq.)

Where other particulate dry solid soluble polymers have been tried as binders for the same carbon grade, they have been sieved to obtain particles having a similar size range to the Methofas PM 4500 above referred to.

The particle size of the dry solid soluble polymer will ideally be related to the particle size of the activated carbon to be used.

In most of the experimental work the grade of both activated carbon particles and of dry solid soluble polymer particles was reasonably constant, i.e.

Activated carbon particles, mesh 0.11 in/square (retain) and 0.25 in/square (pass).

Dry solid soluble polymer particles, mesh 0.0116 in/square (retain) and 0.0275 in/square (pass).

As to area of adhesion, this is a virtually impossible parameter to determine: nor within limits does it seem to be very critical. The activated carbon particles are, of course, of irregular shape, so it is doubtful if, except by averaging, the number of points of contact can be calculated, and it is also not practicable to assess the number of contact-points of activated carbon particles at which dry solid soluble polymer particles lodge. It is the overall effect which is important, in that the conglomerted bonded mass of activated carbon particles as a whole must behave as if it were entirely homogeneous and of course, the least amount of particulate dry solid soluble polymer is used that is found in practice to ensure adequate bonding of the conglomerate for the particular application to which it is put.

We claim:

1. A method of making a conglomerated bonded porous mass of activated carbon particles, comprising:

a. permeating a random and loose mass of activated carbon particles with a solvent in which a subsequently employed polymer is soluble;
    b. removing said solvent from said carbon particles to the extent of leaving substantially only the internal pores of said carbon particles containing said solvent;
    c. mixing the solvent permeated carbon particles from step (b) with dry particles of a solid polymer soluble in said solvent, said polymer particles having a particle size which is not too fine a mesh in order to avoid their solubilizing and spreading over the superficies of said carbon particles, said polymer particles being present in an amount to position said polymer particles at points of contact between adjacent carbon particles over relatively small areas of each carbon particle surface;
    d. evaporating some of said solvent in a manner to cause the solvent to leave the pores of the carbon particles and contact the adjacent polymer particles to solvate at least a portion of the polymer particles and render the particles adhesive at their points of contact with said carbon particles; and
    e. removing the remaining solvent by evaporation, whereby said carbon particles and polymer particles are rigidly bonded by said polymer particles as a conglomerated mass in which the superficies of the carbon particles are covered by said solvated polymer particles over relatively small areas of contact between the carbon particles and the polymer particles.

2. A method according to claim 1 in which the particulate dry solid soluble polymer is an uncured polymer which is heat curable.

3. A method according to claim 2 in which the conglomerated bonded mass of activated carbon particles and dry solid soluble polymer particles is heated after step (e) so as to cure the polymer particles and render said mass solvent resistant.

4. A method according to claim 3 in which the particulate dry solid soluble polymer is polyacrylamide mixed with paraformaldehyde.

5. A method according to claim 1 in which the conglomerated bonded mass of activated carbon particles and particulate dry solid soluble polymer is formed in a mold.

6. A method according to claim 1 in which the said evaporation is effected by heating.

7. Method according to claim 1 in which the ratio of weight of polymer to weight of carbon is in an inverse relationship with the grade of carbon particles used and is so selected as to involve the least amount of polymer which will ensure conglomeration of the mass.

8. A method according to claim 1 in which the conglomerated bonded mass of activated carbon particles is formed in a mold made of perforated metal.

9. A method according to claim 1 in which the conglomerated mass is formed in a mold partially lined with a lamina of porous textile material adapted to adhere to the mass.

10. A process according to claim 1 in which said solvent and said particulate dry solid soluble polymer are selected from the group consisting of water and hydroxypropyl methyl cellulose,
    water and cellulose derivatives related to hydroxypropyl methyl cellulose,
    water and polyvinyl alcohol,
    water and polyacrylamide,
    water and urea-formaldehyde resins, water and casein,
ethanol and polyvinyl butyral,
ethanol and phenol-formaldehyde resins,
acetone and polyvinyl acetate,
acetone and cellulose acetate,
ethyl methyl ketone and vinyl chloride vinyl adetate copolymers,
a mixed solvent of ethanol and toluene and polyvinyl formal, and
carbon tetrachloride and polystyrene.

11. A process according to claim 1 in which said solvent is water and said particulate dry solid soluble polymer is polyacrylamide and paraformaldehyde and in which the conglomerated bonded mass of activated carbon particles is heated after step (e) to cure the polyacrylamide paraformaldehyde bond.

* * * * *